Feb. 12, 1952 W. J. PHANEUF 2,585,166
BURNISHING DEVICE FOR PREFORMED CHANNELS
Filed July 6, 1949 2 SHEETS—SHEET 1
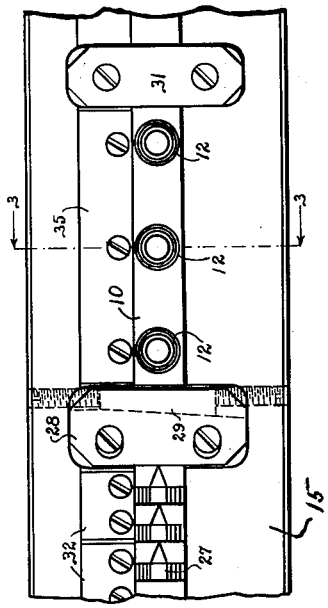
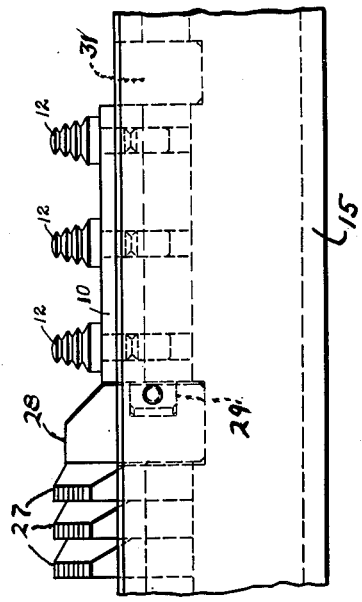
Fig. 1
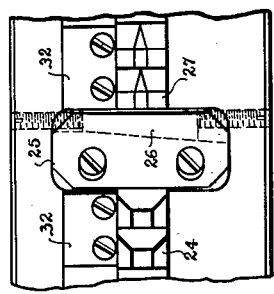
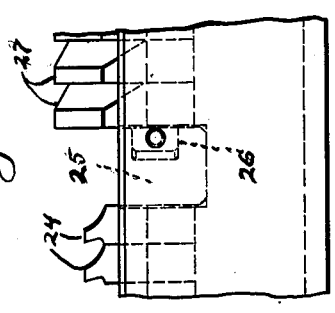
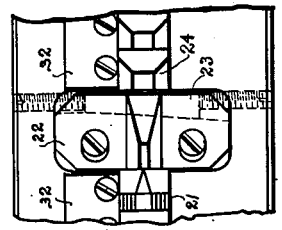
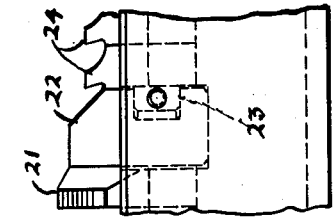
Fig. 2
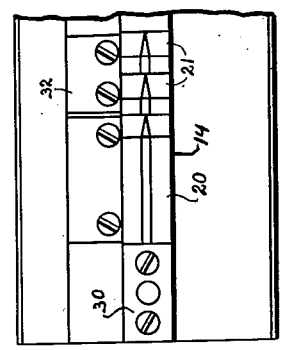
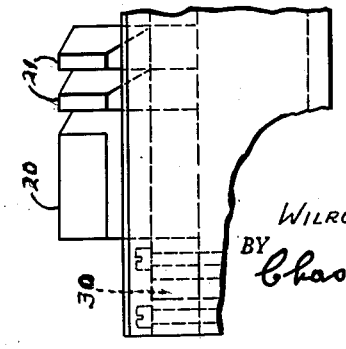
INVENTOR.
WILROSE J. PHANEUF
BY Chas. T. Hawley
Atty.

Feb. 12, 1952 — W. J. PHANEUF — 2,585,166
BURNISHING DEVICE FOR PREFORMED CHANNELS
Filed July 6, 1949 — 2 SHEETS—SHEET 2
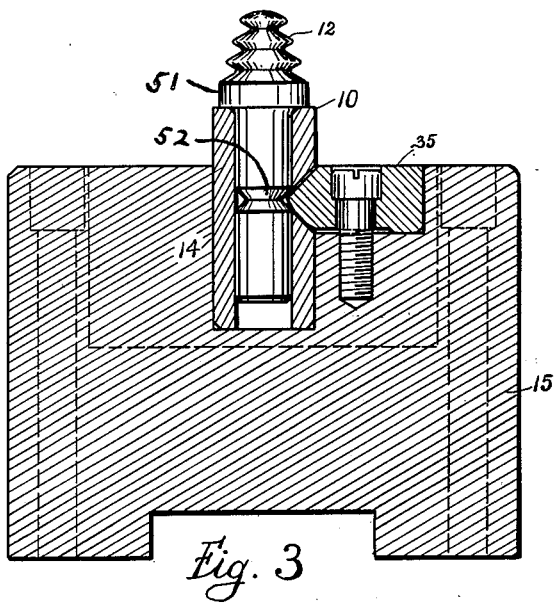
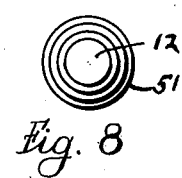
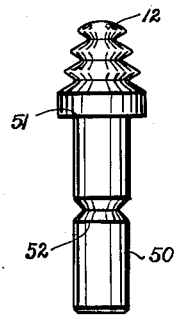
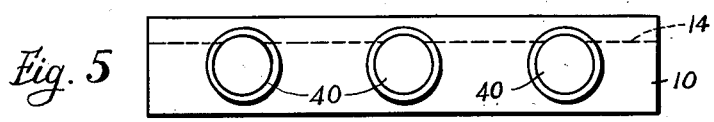
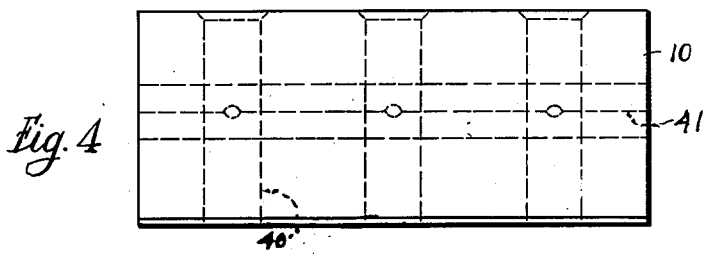
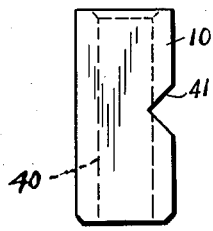
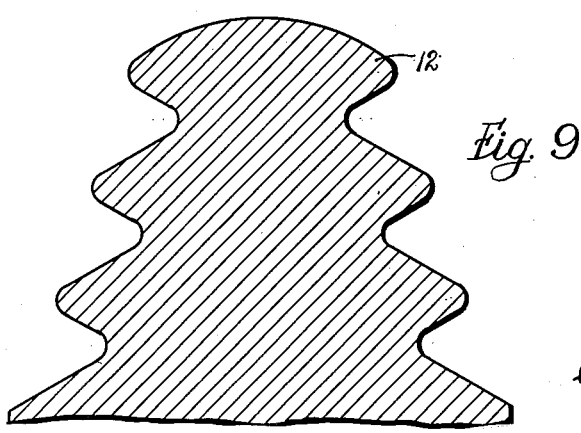
INVENTOR.
WILROSE J. PHANEUF.
BY
Chas. T. Hawley
ATT'Y.

Patented Feb. 12, 1952

2,585,166

UNITED STATES PATENT OFFICE 2,585,166

BURNISHING DEVICE FOR PREFORMED CHANNELS

Wilrose J. Phaneuf, Hudson, Mass., assignor to The Lapointe Machine Tool Company, Hudson, Mass., a corporation of Maine Application July 6, 1949, Serial No. 103,240

2 Claims. (Cl. 29—90)

This invention relates to a device for burnishing the inner wall surfaces of a channel or groove previously formed in a metal structure, as by a milling or broaching operation.

The invention is capable of general application but is particularly adapted for use in a broaching machine and may desirably be mounted at the finishing end of a sectional broach, so that roughing, finishing and burnishing operations may all be performed during a single stroke of the machine.

It is the general object of the invention to provide a burnishing device having a plurality of burnishing elements or buttons movable bodily and simultaneously through the channel or groove to be broached. Each burnishing element is also freely rotatable on its own axis to distribute wear thereon.

A further object of the invention is to provide a construction in which the burnishing elements may be readily removed and replaced when desired.

My invention further relates to arrangements and combinations of parts which will be hereinafter described and more particularly pointed out in the appended claims.

A preferred form of the invention is shown in the drawings, in which:

Fig. 1 is a partial plan view of a sectional broach having my improved burnishing device mounted therein;

Fig. 2 is a side elevation of the sectional broach shown in Fig. 1;

Fig. 3 is a sectional end elevation, taken along the line 3—3 in Fig. 1;

Fig. 4 is a side elevation of a burnishing stand;

Figs. 5 and 6 are plan and end views thereof;

Fig. 7 is a side elevation of one of the burnishing elements or buttons;

Fig. 8 is a plan view thereof; and

Fig. 9 is an enlarged partial cross section of one design of burnishing element.

My improved burnishing device comprises a block or stand 10 in which a plurality of burnishing elements or buttons 12 are mounted in aligned relation.

In Figs. 1 to 3, I have shown the stand 10 mounted in a groove or recess 14 extending longitudinally of a frame member or broach body 15. The groove 14 extends the whole length of the frame member 15 and is adapted to receive a pilot member 20, a plurality of roughing cutters 21, a locking block 22 with a locking wedge 23, a plurality of chamfering cutters 24, an additional locking block 25 and wedge 26, a plurality of finishing cutters 27, and a third locking block 28 and wedge 29. End blocks 30 and 31 are also provided, and clamping bars 32 retain the various cutters seated in the longitudinal recess 14. An additional clamping plate 35 is provided for the burnishing stand 10.

When the broach body or frame 15 is mounted in a broaching machine and is caused to move longitudinally adjacent a previously notched piece of work, the pilot member 20 enters the notch and centers the cut. The notch is then roughed out by the roughing cutters 21, chamfered by the chamfering cutters 24, and cut to finished size by the finishing cutters 27.

The burnishing elements or buttons 12 are then drawn through the finished channel or recess. As the buttons fit snugly in the finished opening, the side walls of the opening are effectively burnished.

As successive burnishing operations are performed, the freely rotatable buttons 12 assume different angular positions, so that the wear on the buttons is distributed and the formation of flat surfaces thereon is substantially prevented.

The detailed construction of the burnishing stand 10 is shown in Figs. 4 to 6, and the detailed construction of one of the burnishing elements or buttons 12 is shown in Figs. 7 to 9.

The burnishing stand 10 has a plurality of transverse openings 40 formed therein, and also has a longitudinal notch or groove 41 formed in one side face thereof. Each burnishing element or button 12 has a shank 50 fitting closely in one of the openings 40 but freely rotatable therein. Each element 12 also has a flange 51 which determines the vertical position of said element or button in the stand 10.

The shank 50 of each button has an annular groove 52 which is vertically aligned with the notch 41 in the stand 10 when the parts are assembled. The clamping bar 35 has a double beveled clamping edge as shown in Fig. 3, and this beveled portion of the bar 35 engages the lower surface of the notch 41 (Fig. 6) in the stand 10 and also extends into the annular groove 52 in each shank 50.

The clamping bar thus holds the stand 10 firmly seated in the longitudinal groove or recess 14, and at the same time prevents axial displacement of the burnishing elements.

The upper end of the burnishing element or button 12 varies in cross section in accordance with the particular groove or channel to be burnished. The section shown in Fig. 9, for instance, is adapted to burnish the so-called "Christmas tree" grooves or channels commonly used in turbine rotors to receive the shanks of the turbine blades.

While I have shown my improved burnishing device as mounted on an elongated broach body or frame and as associated with one or more groups of broaching cutters, this disclosure is illustrative only, and it will be understood that my improved burnishing device may be used in other combinations or may be used to perform an entirely separate burnishing operation.

It is found by actual test that burnished surfaces of very superior quality are produced by the use of this invention.

Having thus described my invention and the advantages thereof, I do not wish to be limited to the details herein disclosed, otherwise than as set forth in the claims, but what I claim is:

1. A burnishing device including a plurality of burnishing elements to be drawn through a broached channel in a piece of work and effective to simultaneously burnish the opposite side walls of said channel, said device comprising a stand having a longitudinal notch therein and also having a plurality of transverse bearing openings therein which are longitudinally aligned with respect to said channel, each burnishing element being mounted for free rotation in one of said bearing openings and having an axial section closely corresponding to the cross section of said broached channel to be burnished and each burnishing element having a cylindrical bearing portion with an annular groove therein, a frame mounted for longitudinal sliding movement and supporting said stand, a clamping bar mounted on said frame and engaging said stand in said longitudinal notch and having a portion projecting into the annular groove of each burnishing element to prevent axial displacement of said element, and means to secure said bar in clamping position.

2. A burnishing device comprising a rigid stand and a plurality of burnishing elements mounted thereon and to be drawn through a broached channel in a piece of work, said burnishing elements being effective to simultaneously burnish the opposite side walls of said channel, said stand having a plurality of transverse bearing openings therein which are longitudinally aligned with respect to said channel, each burnishing element being mounted for free rotation in one of said bearing openings and having an axial section closely corresponding to the cross section of said broached channel to be burnished and each burnishing element having a cylindrical bearing portion with an annular groove therein, a clamping bar having a longitudinal edge portion which is V-shaped in cross section and which is seated and fits closely into the annular groove of each burnishing element when said bar is in clamping position and which bar thereby retains each burnishing element in said stand and also prevents any axial movement of said burnishing element in said stand, and means to secure said bar in clamping position.

WILROSE J. PHANEUF.

REFERENCES CITED

The following references are of record in the file of this patent:

UNITED STATES PATENTS

| Number | Name | Date |
| --- | --- | --- |
| 353,633 | House | Nov. 30, 1886 |
| 1,275,006 | Eden | Aug. 6, 1918 |
| 1,441,502 | Hook | Jan. 9, 1923 |
| 2,056,706 | Blazek et al. | Oct. 6, 1936 |
| 2,204,537 | La Pointe | June 11, 1940 |
| 2,243,158 | Johansson | May 27, 1941 |
| 2,247,887 | Nascimbeni | July 1, 1941 |
| 2,439,822 | Phaneuf | Apr. 20, 1948 |